(12) United States Patent
Goto et al.

(10) Patent No.: US 8,773,054 B2
(45) Date of Patent: Jul. 8, 2014

(54) HYBRID ELECTRIC VEHICLE SYSTEM AND METHOD OF CONTROLLING THE SAME

(75) Inventors: Kosei Goto, Hitachinaka (JP); Yukihiko Oishi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/976,769

(22) PCT Filed: Dec. 9, 2011

(86) PCT No.: PCT/JP2011/078523
§ 371 (c)(1),
(2), (4) Date: Jun. 27, 2013

(87) PCT Pub. No.: WO2012/090677
PCT Pub. Date: Jul. 5, 2012

(65) Prior Publication Data
US 2013/0271051 A1     Oct. 17, 2013

(30) Foreign Application Priority Data
Dec. 28, 2010   (JP) .................................. 2010-291547

(51) Int. Cl.
*H02P 6/16*      (2006.01)

(52) U.S. Cl.
USPC ............ 318/400.26; 318/400.07; 318/400.12; 318/400.13; 318/661; 318/653; 318/400.39; 701/39; 714/2; 714/746; 714/750; 714/799

(58) Field of Classification Search
CPC ...... B60L 15/20; B60L 3/0038; B60W 10/08; B60W 10/26; H02P 2201/09
USPC ............ 318/400.07, 400.12, 400.26, 400.13, 318/661, 652, 653, 400.39; 701/39; 714/2, 714/746, 750, 799
See application file for complete search history.

(56) References Cited

U.S. PATENT DOCUMENTS 4,520,300 A * 5/1985 Fradella .................. 318/603
5,491,647 A * 2/1996 O'Brien et al. .................. 701/99

(Continued)

FOREIGN PATENT DOCUMENTS

JP    2005-133614 A    5/2005
JP    2006-50878 A     2/2006

OTHER PUBLICATIONS

Japanese-language Office Action dated Jun. 25, 2013 (two (2) pages).

(Continued)

*Primary Examiner* — Rita Leykin
(74) *Attorney, Agent, or Firm* — Crowell & Moring LLP

(57) ABSTRACT

The present invention is directed to a method of estimating a motor rotation angle that does not affect precision of a detected angle of a crank angle sensor, which is an alternative sensor, when abnormality occurs in a resolver and a peripheral circuit, and performing a motor control without failure of an inverter or peripheral device. A vehicle system includes a motor, a resolver detecting a rotor rotation angle of the motor, a motor control circuit controlling the motor based on information on rotor rotation angle and torque command value, an engine connected to the motor through a crankshaft, and a crankshaft sensor detecting revolutions of the crankshaft, in which the motor control circuit estimates rotor rotation angle based on a variation rate of the number of revolutions of the crankshaft when abnormality of the resolver is detected, and performs a weak field control based on estimated rotor rotation angle.

4 Claims, 7 Drawing Sheets

(56) References Cited

U.S. PATENT DOCUMENTS

| | | |
|---|---|---|
| 7,294,988 B2 * | 11/2007 | Ajima et al. .................. 318/712 |
| 7,973,502 B2 * | 7/2011 | Nakagawa et al. ...... 318/400.16 |
| 2005/0096865 A1 | 5/2005 | Sugiura et al. |

OTHER PUBLICATIONS

Corresponding International Search Report with English Translation dated Jan. 10, 2012 (three (3) pages).

* cited by examiner

φa : INTERLINKAGE MAGNETIC FLUX ACCORDING TO MAGNET OF MOTOR
ω : ANGULAR VELOCITY OF MOTOR (NUMBER OF REVOLUTIONS OF MOTOR)
Ia : MOTOR CURRENT
β : CONTROL PHASE ANGLE
Iq : q-AXIS COMPONENT OF Ia
Id : d-AXIS COMPONENT OF Ia

HYBRID ELECTRIC VEHICLE SYSTEM AND METHOD OF CONTROLLING THE SAME

TECHNICAL FIELD

The present invention relates to a method of controlling a motor mounted in an electric vehicle such as a hybrid electric vehicle.

BACKGROUND ART

A hybrid electric vehicle is a vehicle including a motor in addition to an engine in the related art as a travel driving source, traveling only with the motor being driven or driving the motor to start or assist the engine, or performing regeneration (generation) to charge a battery.

In order to detect a rotation angle and the number of revolutions of the motor, a rotation angle sensor such as a resolver is attached to the motor, and a motor control apparatus (inverter) performs motor control most efficiently based on information on the rotation angle or the number of revolutions from the resolver.

However, because the motor control apparatus (inverter) cannot accurately detect the rotation angle or the number of revolutions of the motor when the resolver or a peripheral circuit thereof fails, it is difficult to normally perform the motor control. Therefore, for a fail safe measure, a method of stopping the motor control and continuing traveling only with the engine is considered, but in this case, because the battery cannot be charged by the motor, a battery capacity is gradually decreased, and as a result, the traveling only with the engine becomes impossible such that the vehicle stops.

Therefore, in PTL 1, when a resolver is determined as abnormal, a motor control continues using a rotation angle detected by a crank angle sensor mounted on a crankshaft of an engine which is rotated while being synchronized with a motor, instead of using a motor rotation angle detected by the resolver. Further, reliability of the motor rotation angle is improved in consideration of a delay of a communication time until rotation angle information is transmitted to a motor control apparatus (inverter) after the rotation angle is detected by the crank angle sensor.

CITATION LIST

Patent Literature

PTL 1: Japanese Patent Application Laid-Open No. 2006-050878

SUMMARY OF INVENTION

Technical Problem

However, because in the aforementioned related art, rotation angle information of the crank angle sensor is used, and thus precision (resolution) of the detected angle is much coarser than that of the resolver, a weak field control, which is indispensable for the motor control, cannot be appropriately carried out. For this reason, there is a concern that an induced voltage of the motor cannot be suppressed, an overvoltage occurs in a switching semiconductor element, a capacitor, or the like inside the inverter, and the inverter fails due to the overvoltage.

FIG. 7 illustrates a comparison between angle information of the crank angle sensor and angle information of the resolver when the pole pair number of the motor is four. Because the crank angle sensor outputs sixty pulses per one revolution of the engine, the rotation angle may be detected only with precision of fifteen pulses per one period of a motor electrical angle, but the resolver may detect the rotation angle with precision of 512 to 1,024 bits per one period of the motor electrical angle. The electrical angle per one pulse (one bit) is 24° in the crank angle sensor but 0.7 to 0.35° in the resolver, which is very high precision.

Therefore, in a case in which a vector control of the motor is performed by using rotation angle information of the crank angle sensor, a current cannot be controlled with respect to the induced voltage in an appropriate direction (a d-axis current and a q-axis current cannot be appropriately controlled). Originally, a weak field control is performed by allowing the d-axis current in a negative direction to flow in order to suppress the induced voltage of the motor, but because the rotation angle information is very coarse, the d-axis current flows in a positive direction, and the field may get into a state of a strong field. Even in a state of low rotation in which the induced voltage of the motor is low, there is a concern that an overvoltage may occur when the strong field occurs.

Further, the state in which the precision (resolution) of the detected angle is coarse causes the following problems other than the weak field control.

(1) Necessary torque cannot be output because fluctuation (ripple) of output torque is high.

(2) Fluctuation (ripple) of current and voltage is high.

With respect to (1), because sufficient torque cannot be output, the engine cannot be restarted by driving the motor after the engine stops, for example, in idling stop mode. Further, because an appropriate current and voltage cannot be supplied to the battery when regeneration (generation) is performed during traveling to charge a battery, there is a concern that the battery becomes in a state of being overcharged or charge deficient, and deterioration of a life span or failure of the battery may be caused. With respect to (2), there is also a concern that deterioration of a life span or failure of a capacitor inside the inverter or the battery may be caused.

The present invention has been made in consideration of the problem, and the object of the present invention is to provide a method of estimating a motor rotation angle which does not affect precision (resolution) of a detected angle of a crank angle sensor, which is an alternative sensor, when abnormality occurs in a resolver and a peripheral circuit thereof, and to perform a motor control (weak field control) without causing failure of an inverter or a peripheral device thereof.

Solution to Problem

In order to achieve the object, there is provided a hybrid vehicle system according to the present invention, including: an inverter circuit having a switching element which converts a direct current into an alternate current; a motor for driving a vehicle which receives the alternate current to be driven; a resolver which detects a rotor rotation angle of the motor; a control circuit which controls a switching operation of the switching element based on information on the rotor rotation angle and a torque command value; an engine connected to the motor through a crankshaft; and a crankshaft sensor which detects the number of revolutions of the crankshaft, wherein, when abnormality of the resolver is detected, the control circuit estimates the rotor rotation angle based on a variation rate of the number of revolutions of the crankshaft and performs weak field control based on the estimated rotor rotation angle.

In order to achieve the object, there is provided a method of controlling a hybrid vehicle system according to the present invention and the hybrid vehicle system includes an inverter circuit having a switching element which converts a direct current into an alternate current, a motor for driving a vehicle which receives the alternate current to be driven, a resolver which detects a rotor rotation angle of the motor, a control circuit which controls a switching operation of the switching element based on information on the rotor rotation angle and a torque command value, an engine connected to the motor through a crankshaft, and a crankshaft sensor which detects the number of revolutions of the crankshaft. The method includes estimating the rotor rotation angle based on a variation rate of the number of revolutions of the crankshaft and performing a weak field control based on the estimated rotor rotation angle when abnormality of the resolver is detected.

In the hybrid vehicle system and the method of controlling the hybrid vehicle system according to the present invention, the estimated rotor rotation angle may be calculated based on the number of revolutions of the motor before the abnormality of the resolver is detected, and a variation rate of the number of revolutions of the crankshaft after the abnormality of the resolver is detected.

In the hybrid vehicle system and the method of controlling the hybrid vehicle system according to the present invention, the estimated rotor rotation angle may be corrected based on information on the number of revolutions of the motor stored when the resolver is normal.

In the hybrid vehicle system and the method of controlling the hybrid vehicle system according to the present invention, timing of correcting the estimated rotor rotation angle may be when a crank angle, which is calculated by information from the crankshaft sensor, is a predetermined pulse position.

Advantageous Effects of Invention

Significant deterioration of controllability of a motor may be suppressed even when abnormality occurs in a resolver or a peripheral circuit thereof.

Other objects, characteristics and advantages of the present invention will be obvious from the following disclosure of the embodiment of the present invention regarding the accompanying drawings.

DESCRIPTION OF EMBODIMENTS

Figure 1:
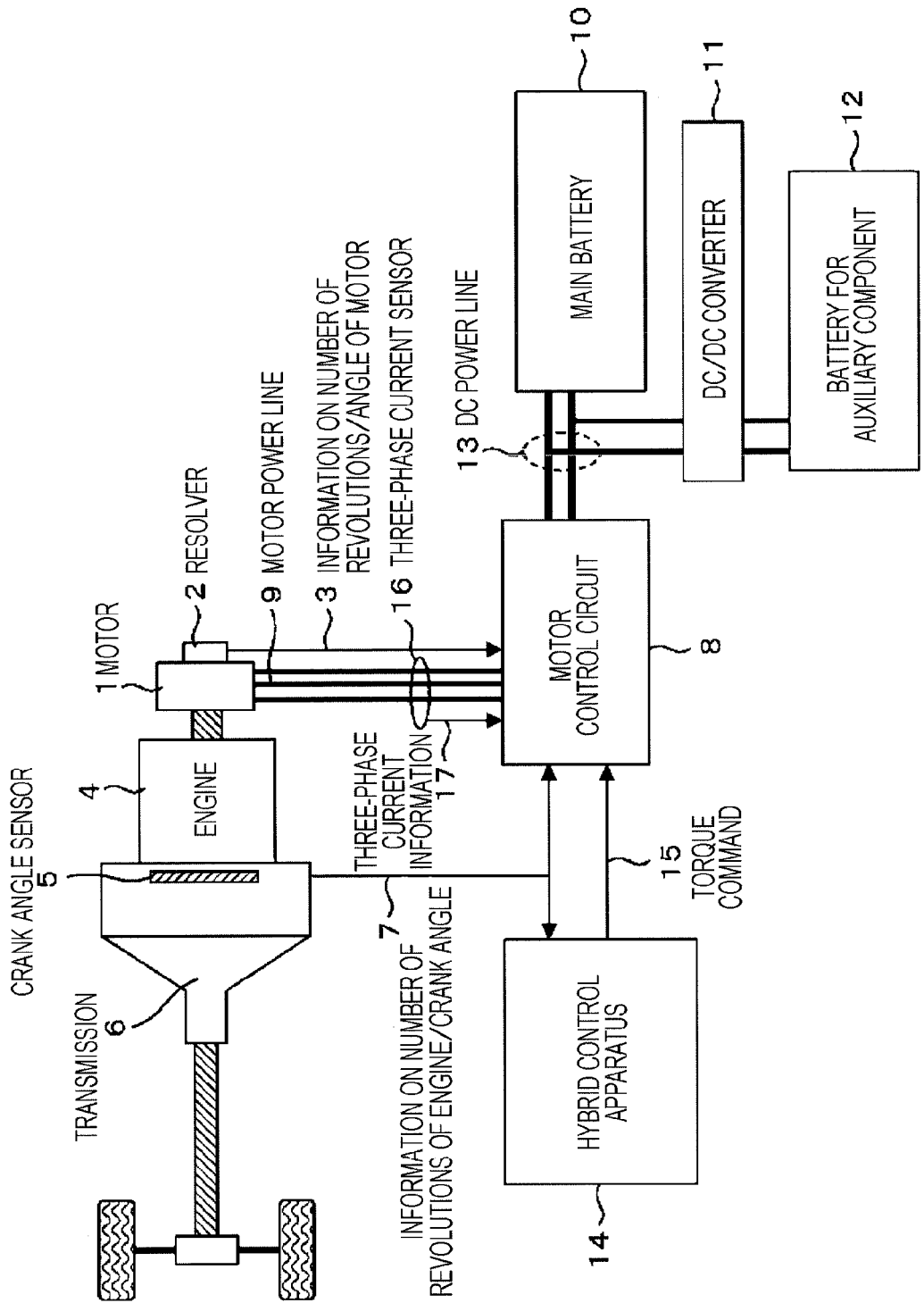
FIG. 1 is a configuration diagram of a system of a hybrid electric vehicle that is an example of an embodiment of the present invention.

FIG. 1 is a configuration diagram of a system of a hybrid vehicle that is an example of an embodiment. As illustrated in FIG. 1, a system of a hybrid vehicle includes a motor 1 for driving a vehicle, a resolver 2 which detects the number of revolutions and a rotation angle of the motor 1, an engine 4 connected to the motor 1 through a crankshaft, a crank angle sensor 5 which detects the number of revolutions and a rotation angle of the crankshaft of the engine 4, a transmission 6 which transmits a rotational force of the crankshaft to an axle, a hybrid control apparatus 14 which controls the entire vehicle, a motor control circuit 8, a three-phase current sensor 16, a main battery 10, a DC/DC converter 11, and a battery 12 for an auxiliary component.

The main battery 10 is a high voltage battery to drive the motor 1, and is a secondary battery formed of lithium ion, nickel hydride or the like.

The battery 12 for an auxiliary component is a low voltage battery that drives a so-called auxiliary component such as electronic equipment including a controller or a headlight inside the vehicle.

The DC/DC converter 11 drops a high voltage of the main battery 10 to a low voltage of the battery 12 for an auxiliary component to charge the battery 12 for an auxiliary component.

The motor control circuit 8 converts a direct current (DC) voltage, which is supplied from the main battery 10 through a DC power line 13 into a three-phase alternate current (AC) voltage of U, V, and W and outputs the three-phase AC voltage to a motor coil of the motor 1 through a motor power line 9, or converts a three-phase AC voltage generated by the motor 1 into a DC voltage and supplies the DC voltage to the main battery 10 (charges the main battery 10 with the DC voltage).

Further, the motor control circuit 8 includes an inverter circuit having a switching element which converts a direct current from the main battery 10 into an alternate current, and a control circuit which controls a switching operation of the switching element based on information, which is output from the resolver 2, and a torque command value 15. In addition, the motor control circuit 8 further includes a smoothing capacitor circuit to smooth the direct current from the main battery 10.

The motor 1 is a three-phase AC motor including a permanent magnet type rotor.

The engine 4, for example, is an inline-four engine. The engine 4 is driven by the motor 1 while receiving positive torque from the motor 1 via the crankshaft when starting or being assisted, and the motor 1 is driven by the engine 4 to regenerate while receiving negative torque from the motor 1 when the vehicle travels.

The crank angle sensor 5 detects the number of revolutions of the engine 4 and a rotation angle of the crankshaft, and information 7 on the number of revolutions of the engine/the crank angle is used to calculate fuel injection timing or ignition timing of the engine 4 by the hybrid control apparatus 14.

Figure 2:
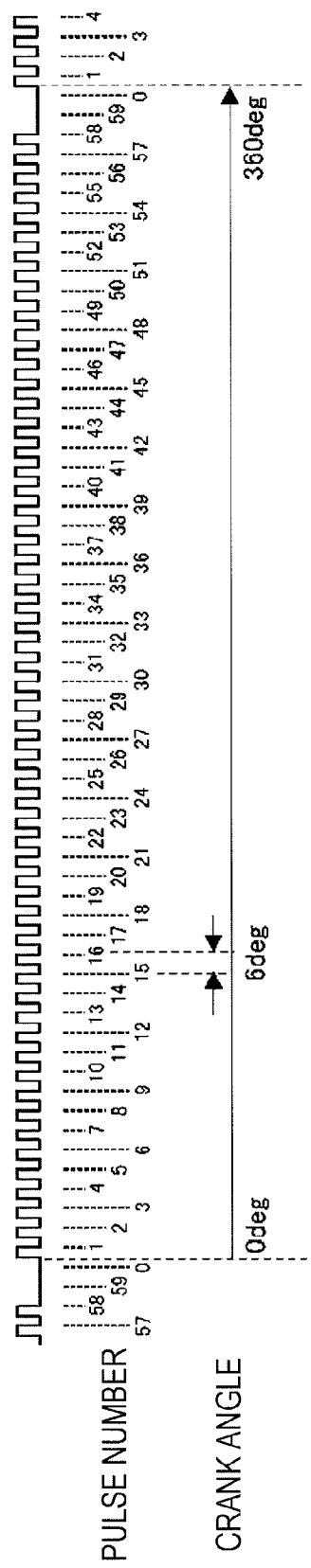
FIG. 2 illustrates a signal waveform of angle information (pulse) from a crank angle sensor that is an example of an embodiment of the present invention.
Figure 7:
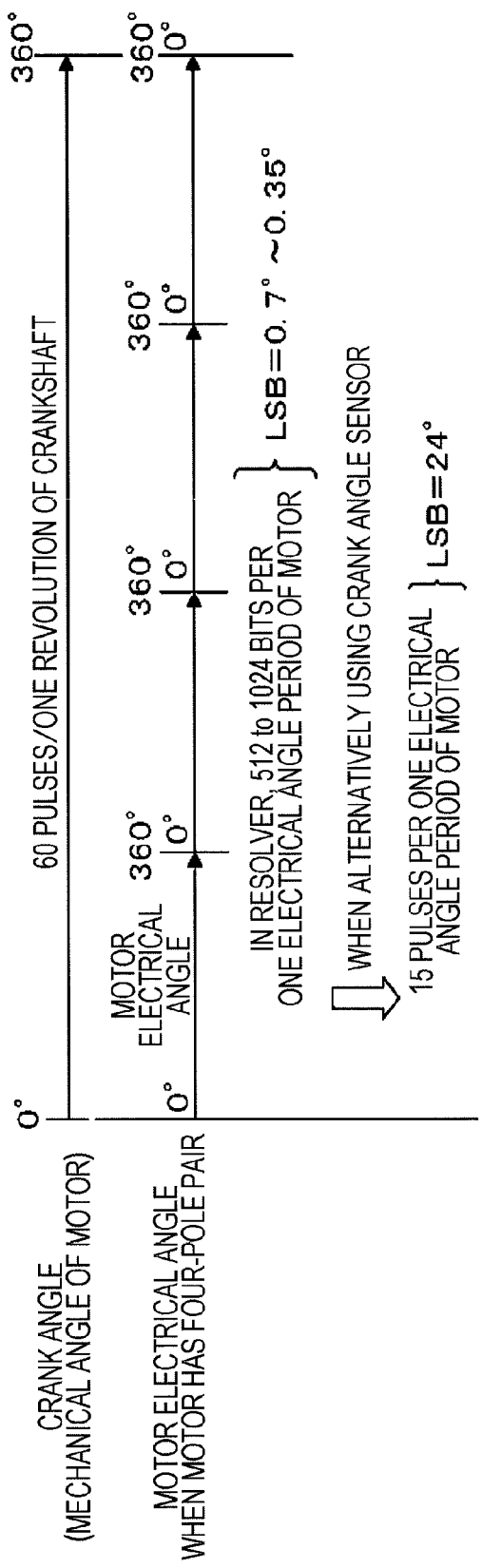
FIG. 7 is a view illustrating a comparison of angle information of a crank angle sensor and angle information of a resolver when the pole pair number of the motor according to an embodiment of the present invention is four.

The information 7 on the number of revolutions of the engine/the crank angle from the crank angle sensor 5, for example, has a pulse waveform as illustrated in FIG. 2 and one pulse is output every time the crankshaft rotates 6°. Further, pulses at 354° (59th pulse) and 360° (60th pulse) are not created to indicate reference points. That is, (60−2) pulses are output every one revolution (360°) of the engine. The hybrid control apparatus 14 detects an ordinal number of a pulse corresponding to the present tooth, and calculates a rotation angle. In addition, the hybrid control apparatus 14 detects how many pulses are generated in a predetermined time, and calculates the number of revolutions. Precision (resolution) of the information 7 on the number of revolutions of the engine/the crank angle from the crank angle sensor 5 is 60 pulses per one revolution of the engine (6° per one pulse), but, for example, in a case in which the motor has a four-pole pair, the precision (resolution) becomes 15 pulses per one period of the motor electrical angle (24° of the electrical angle per one pulse), as illustrated in FIG. 7.

The resolver 2 is mounted on the motor 1, and the information 3 on the detected number of revolutions/angle of the motor is input to the motor control circuit 8 through a harness.

Figure 3:
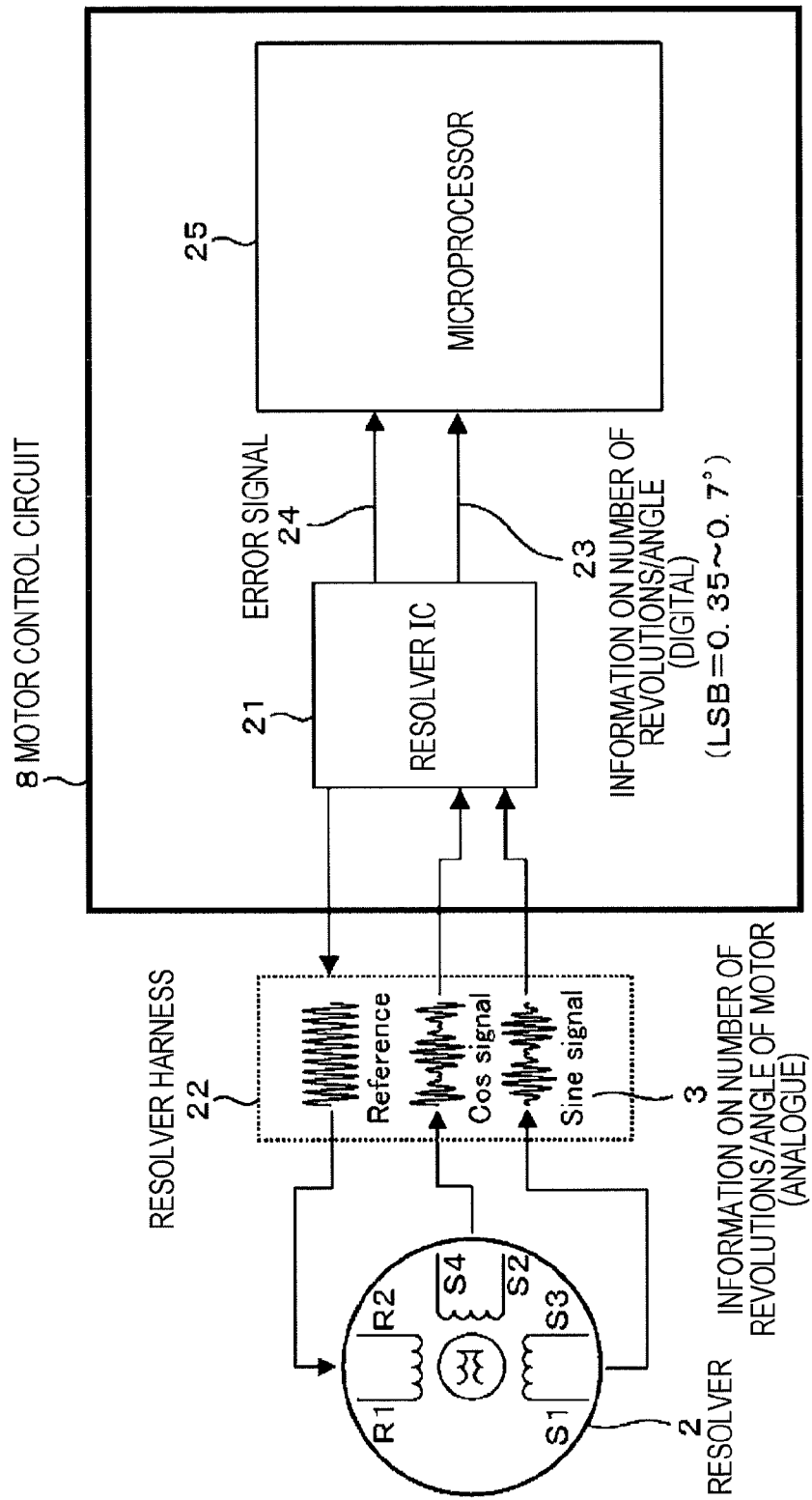
FIG. 3 is a view illustrating a resolver and a peripheral circuit thereof according to an embodiment of the present invention.

The information 3 on the number of revolutions/the angle of the motor from the resolver 2 has an analogue waveform, as illustrated in FIG. 3, and is converted into digital values 23 of the number of revolutions and the rotation angle by a resolver IC 21 mounted in the motor control circuit 8. Precision (resolution) of the rotation angle, which is converted into the digital value 23, depends on a performance of the resolver IC 21, but typically is precision of 512 to 1,024 bits per one period of the motor electrical angle (0.7 to 0.35° of the electrical angle per one bit).

As an example of a failure of the resolver 2 and peripheral circuit thereof, a disconnection or a short circuit of a resolver harness 22 is considered. In this case, the resolver IC 21 performs a diagnosis and outputs an error signal 24 to a microprocessor 25, and therefore the microprocessor 25 detects abnormality. Further, the microprocessor 25 is a computing element which is needed to implement a motor control.

Further, the resolver IC 21 has the following diagnostic functions, and reports an abnormality state by outputting the error signal 24 to the microprocessor 25 at the time of abnormality.

(1) Amplitude of the information 3 (analogue signal) (sine waveform/cosine waveform) on the number of revolutions/the angle of the motor is lower than a normal value (disconnection of the resolver harness 22, failure of a main body of the resolver 2)

(2) Amplitude of the information 3 (analogue signal) (sine waveform/cosine waveform) on the number of revolutions/the angle of the motor is higher than a normal value (short-circuit of the resolver harness 22, failure of a main body of the resolver 2)

(3) Failure of the resolver IC 21

The motor control circuit 8 performs a three-phase vector control to flow a three-phase current to have the most efficient phase angle based on the information 3 on the number of revolutions/the angle of the motor 1 detected by resolver 2, three-phase current information 17 detected by the three-phase current sensor 16, and a torque command value 15 from the hybrid control apparatus 14.

Figure 4:
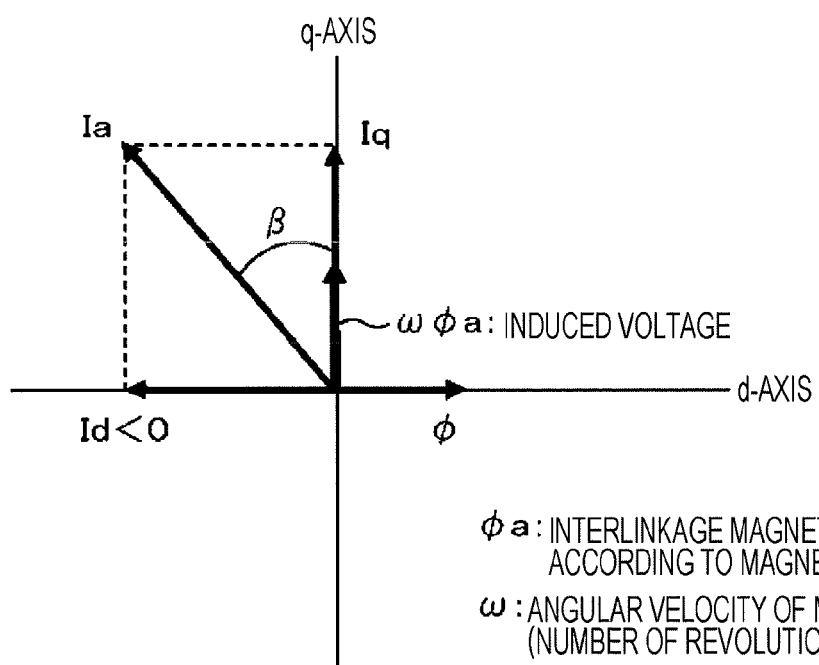
FIG. 4 is an example of a vector view of a d-q-axis coordinate system used for a vector control.

FIG. 4 is a vector view in which a three-phase coordinate system is converted into a two phase coordinate system (d-q axis coordinate system). Typically, in a case in which positive torque is output, a current $I_a$ is controlled to flow to a region of ($I_q$>0, $I_d$<0), as illustrated in FIG. 4. Further, in a case in which negative torque is output, a current $I_a$ is controlled to flow to a region of ($I_q$<0, $I_d$<0). The reason for ($I_d$<0) in both cases is that an induced voltage of the motor is suppressed by allowing a current flow to offset magnetic flux that is generated by a magnet of the motor and performing the weak field.

In addition, a value of output torque T is represented by the following equation.

[Equation 1]

$$T = P\left\{\phi_a \cdot I_a \cdot \cos\beta + \frac{1}{2}(L_q - L_d)I_a^2 \cdot \sin 2\beta\right\} \quad \text{(Equation 1)}$$

Figure 5:
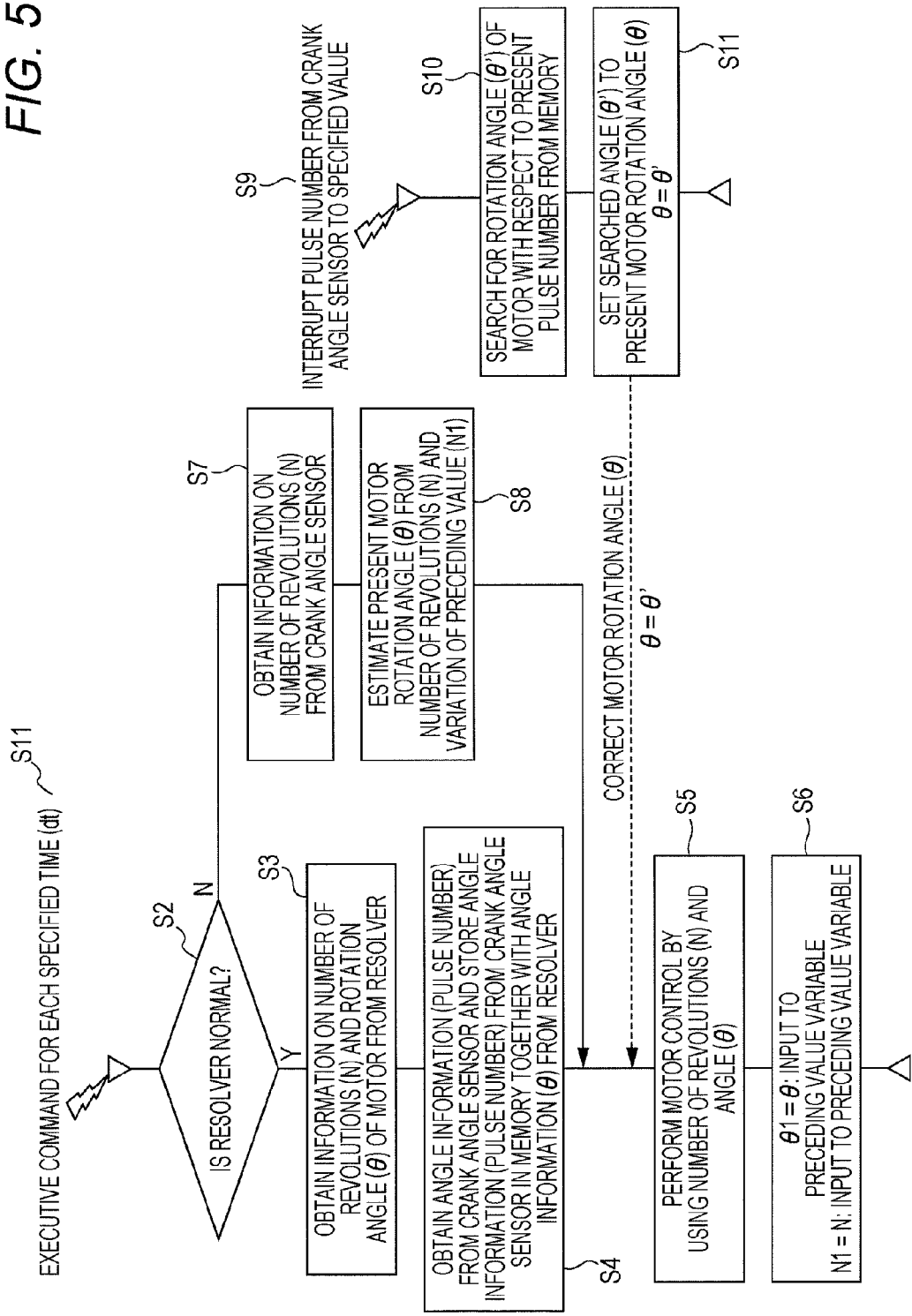
FIG. 5 is a flow chart illustrating a control method when a resolver or a peripheral circuit, which is an example of an embodiment of the present invention, is normal, and when abnormality is detected.

Here, P: the pole pair number of the motor, $\phi_a$: interlinkage magnetic flux according to a permanent magnet, $I_a$: motor current, $L_q$: q-axis inductance, $L_d$: d-axis inductance, $\beta$: phase angle FIG. 5 is a flow chart illustrating a control method when the resolver 2 or a peripheral circuit thereof is normal, and when abnormality is detected. Hereinafter, the control method will be described with reference to FIG. 5.

First, when an executive command S1 is given for each period of a specified time dt, whether the resolver is normal is determined in a determination process S2.

In a case in which the resolver is normal, information on the number of revolutions N and an angle θ of the motor is obtained from the resolver in a process S3. Further, angle information (pulse number) is obtained from the crank angle sensor in a process S4, and the pulse number and the motor angle θ from the resolver, which is obtained in the process S3, are stored in a memory.

Further, the motor control is performed in a process S5 by using the number of revolutions N and the angle θ, the present number of revolutions N and angle θ are input to each preceding value variable N1 and θ1 in a process S6, and the processes are ended. In addition, the motor control of the process S5 includes the weak field control that has been described with reference to FIG. 4.

In a case in which it is determined that the resolver is abnormal in the determination process S2, information on the present number of revolutions N of the engine is obtained from the crank angle sensor in a process S7. Further, the present motor angle θ is estimated in a process S8 based on a variation between the number of revolutions N of the engine obtained in the process S7 and the preceding value N1 set in the process S6.

Further, the motor control is performed in the process S5 by using the number of revolutions N and the angle θ, the present number of revolutions N and angle θ are input to each preceding value variable N1 and θ1 in the process S6, and the processes are ended.

Further, in a case in which it is determined that the resolver is abnormal in the determination process S2, an interrupt S9 occurs when the angle information (pulse number) from the crank angle sensor becomes a preset specific value. In a process S10, when the interrupt S9 occurs, a motor angle θ' with respect to the pulse number, which is a factor of the interrupt, is searched from the information on the pulse number and the motor angle θ which are stored in the memory in the process S3 when the resolver is normal. In addition, in a process S11, the present motor angle θ is corrected to the searched motor angle θ'. By performing this correction process, precision of the motor angle θ estimated in the process S8 may be increased, and reliability of the motor control may be improved.

Hereinafter, the estimation method of the process S8 will be described with reference to FIG. 6.

Figure 6:
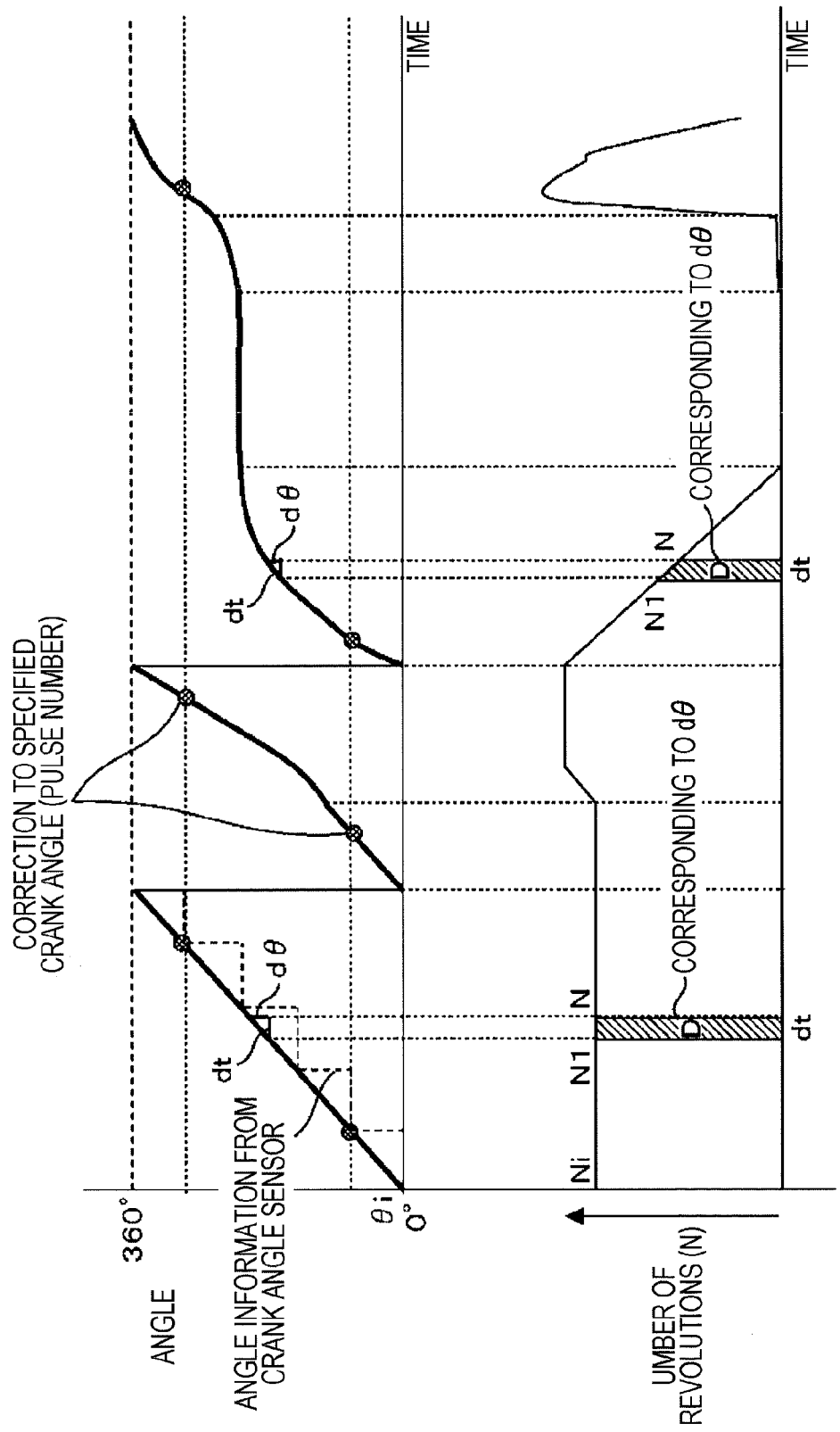
FIG. 6 shows a relationship between the number of revolutions of an engine from a crank angle sensor according to an embodiment of the present invention, and an estimated rotation angle of a motor.

FIG. 6 illustrates a relationship between the number of revolutions N of the engine from the crank angle sensor and the rotation angle θ of the motor estimated in the process S8.

A variation of the number of revolutions N of the engine during the specified time dt corresponds to a variation dθ of the rotation angle (electrical angle) of the motor. That is, an area of a region D enclosed by the present number of revolutions N of the engine and the number of revolutions N1 of the engine the specified time dt before corresponds to the variation dθ of the rotation angle (electrical angle) of the motor. In addition, initial values of the number of revolutions N1 of the engine and the estimated rotation angle θ1 of the motor the specified time dt before are the number of revolutions Ni of the motor 1 and a rotation angle θi of the motor 1 immediately before an abnormality detection, respectively.

Assuming that the specified time dt is very short, because the motor 1 and the engine 4 have inertia, it is considered that the variation (N−N1) of the number of revolutions during the specified time dt is minute. Therefore, the variation dθ of the rotation angle (electrical angle) of the motor 1 during the specified time dt is calculated by the following equation.

[Equation 2]

$$d\theta = \text{area of region}(D) = N \cdot dt \cdot K \quad \text{(Equation 2)}$$

Here, K: conversion coefficient

In addition, the present estimated rotation angle θ of the motor is calculated by the following equation from the estimated rotation angle θ1 of the motor the specified time dt before, and the variation dθ of the rotation angle (electrical angle) of the motor 1.

[Equation 3]

$$\theta = \theta 1 + d\theta \quad \text{(Equation 3)}$$

Further, when the crank angle information from the crank angle sensor 5 becomes a predetermined pulse number, the angle information θ' of the motor 1 stored in the memory before the abnormality detection is corrected to the present estimated rotation angle θ of the motor.

[Equation 4]

$$\theta = \theta' \quad \text{(Equation 4)}$$

By Equations 2 and 3, the rotation angle (electrical angle) of the motor 1 may be estimated by using a variation rate of the number of revolutions N of the engine, that is, a variation rate of the number of revolutions of the crankshaft. Accordingly, the rotation angle (electrical angle) of the motor may be estimated without being affected by coarseness of precision of the crank angle information from the crank angle sensor. Further, the estimated rotation angle of the motor 1 is corrected by Equation 4, and therefore reliability of the estimated rotation angle θ of the motor may be improved.

While the disclosure has been described in terms of exemplary embodiments, the present invention is not limited thereto, and those skilled in the art will recognize that various modifications and corrections may be made within the spirit of the present invention and the scope of the appended claims.

| Reference Signs List | |
|---|---|
| 1 | motor |
| 2 | resolver |
| 3 | information on number of revolutions/angle of motor |
| 4 | engine |
| 5 | crank angle sensor |
| 6 | transmission |
| 7 | information on number of revolutions of engine/crank angle |
| 8 | motor control circuit |
| 9 | motor power line |
| 10 | main battery |
| 11 | DC/DC converter |
| 12 | battery for auxiliary component |
| 13 | DC power line |
| 14 | hybrid control apparatus |
| 15 | torque command |
| 16 | three-phase current sensor |
| 17 | three-phase current information |

The invention claimed is:

1. A hybrid vehicle system, comprising:
an inverter circuit having a switching element which converts a direct current into an alternate current;
a motor for driving a vehicle which receives the alternate current to be driven;
a resolver which detects a rotor rotation angle of the motor;
a control circuit which controls a switching operation of the switching element based on information on the rotor rotation angle and a torque command value;
an engine connected to the motor through a crankshaft; and
a crankshaft sensor which detects the number of revolutions of the crankshaft,
wherein, when abnormality of the resolver is detected, the control circuit estimates the rotor rotation angle based on a difference between the present number of revolutions of the crankshaft and the number of revolutions of the crankshaft, which is detected a specified time before, and performs motor control including a weak field control based on the estimated rotor rotation angle, and
wherein the specified time is a short period during which the difference between the numbers of revolutions of the crankshaft is minute.

2. The hybrid vehicle system according to claim 1, wherein the crank angle sensor detects a rotation angle of the crankshaft, and that,
when the resolver is normal, the control circuit stores rotation angle information of the motor for every specific rotation angle information of the crankshaft sensor, and corrects the estimated rotor rotation angle based on the stored information.

3. A method of controlling a hybrid vehicle system which comprises:
an inverter circuit having a switching element which converts a direct current into an alternate current,
a motor for driving a vehicle which receives the alternate current to be driven,
a resolver which detects a rotor rotation angle of the motor,
a control circuit which controls a switching operation of the switching element based on information on the rotor rotation angle and a torque command value,
an engine connected to the motor through a crankshaft, and
a crankshaft sensor which detects the number of revolutions of the crankshaft, the method comprising:
estimating the rotor rotation angle based on a difference between the present number of revolutions of the crankshaft, and the number of revolutions of the crankshaft, which is detected a specified time before and performing a motor control including a weak field control based on the estimated rotor rotation angle when abnormality of the resolver is detected,
wherein the specified time is a short period during which the difference between the numbers of revolutions of the crankshaft is minute.

4. The method of controlling a hybrid vehicle system according to claim 3, wherein the crank angle sensor detects a rotation angle of the crankshaft, and that, when the resolver is normal, rotation angle information of the motor for every piece of specific rotation angle information of the crankshaft sensor is stored, and the estimated rotor rotation angle is corrected based on the stored information.

\* \* \* \* \*